(12) United States Patent
Todoriki et al.

(10) Patent No.: US 10,243,214 B2
(45) Date of Patent: *Mar. 26, 2019

(54) METHOD OF MANUFACTURING ELECTRODE

(75) Inventors: Hiroatsu Todoriki, Kanagawa (JP); Junpei Momo, Kanagawa (JP); Teppei Oguni, Kanagawa (JP); Nobuhiro Inoue, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 1619 days.

This patent is subject to a terminal disclaimer.

(21) Appl. No.: 13/480,628

(22) Filed: May 25, 2012

(65) Prior Publication Data

US 2012/0308891 A1 Dec. 6, 2012

(30) Foreign Application Priority Data

| Jun. 3, 2011 | (JP) | ................................ | 2011-124861 |
| Jun. 24, 2011 | (JP) | ................................ | 2011-140521 |
| Jun. 24, 2011 | (JP) | ................................ | 2011-141018 |

(51) Int. Cl.
*H01M 4/131* (2010.01)
*H01M 4/04* (2006.01)
(Continued)

(52) U.S. Cl.
CPC ......... *H01M 4/624* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 001272227 A | 11/2000 |
| CN | 001449589 A | 10/2003 |

(Continued)

OTHER PUBLICATIONS

Wang et al. A facile method of preparing mixed conducting LiFePO4/graphene composites for lithium-ion batteries, Solid State Ionics 181 (2010) 1685-1689.*

(Continued)

*Primary Examiner* — Ula C Ruddock
*Assistant Examiner* — Anna Korovina
(74) *Attorney, Agent, or Firm* — Nixon Peabody LLP; Jeffrey L. Costellia

(57) ABSTRACT

To increase the conductivity and electric capacity of an electrode which includes active material particles and the like and is used in a battery, a graphene net including 1 to 100 graphene sheets is used instead of a conventionally used conduction auxiliary agent and binder. The graphene net which has a two-dimensional expansion and a three-dimensional structure is more likely to touch active material particles or another conduction auxiliary agent, thereby increasing the conductivity and the bonding strength between active material particles. This graphene net is obtained by mixing graphene oxide and active material particles and then heating the mixture in a vacuum or a reducing atmosphere.

24 Claims, 10 Drawing Sheets

(51) Int. Cl.
  *H01M 4/36* (2006.01)
  *H01M 4/62* (2006.01)
  *H01M 4/525* (2010.01)
  *H01M 4/505* (2010.01)
  *H01M 4/58* (2010.01)
  *H01M 4/587* (2010.01)
  *H01M 10/052* (2010.01)

(52) U.S. Cl.
  CPC .......... *H01M 4/131* (2013.01); *H01M 4/364* (2013.01); *H01M 4/505* (2013.01); *H01M 4/525* (2013.01); *H01M 4/587* (2013.01); *H01M 4/5825* (2013.01); *H01M 4/625* (2013.01); *H01M 4/627* (2013.01); *H01M 10/052* (2013.01)

(56) References Cited

U.S. PATENT DOCUMENTS

| | | | |
|---|---|---|---|
| 5,783,333 A | 7/1998 | Mayer | |
| 5,871,866 A | 2/1999 | Barker et al. | |
| 5,910,382 A | 6/1999 | Goodenough et al. | |
| 6,085,015 A | 7/2000 | Armand et al. | |
| 6,432,579 B1 | 8/2002 | Tsuji et al. | |
| 6,514,640 B1 | 2/2003 | Armand et al. | |
| 7,179,561 B2 | 2/2007 | Niu et al. | |
| 7,572,542 B2 | 8/2009 | Naoi | |
| 7,658,901 B2 | 2/2010 | Prud'Homme et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,105,716 B2 | 1/2012 | Sheem et al. | |
| 8,241,794 B2 | 8/2012 | Sheem et al. | |
| 8,278,011 B2 | 10/2012 | Zhu et al. | |
| 8,317,984 B2 | 11/2012 | Gilje | |
| 9,045,346 B2 | 6/2015 | Nesper et al. | |
| 9,156,701 B2 | 10/2015 | Ho et al. | |
| 9,293,770 B2 * | 3/2016 | Todoriki | H01M 4/625 |
| 9,373,834 B2 * | 6/2016 | Yamakaji | H01M 4/0404 |
| 2001/0010807 A1 | 8/2001 | Matsubara | |
| 2002/0102459 A1 | 8/2002 | Hosoya et al. | |
| 2002/0195591 A1 | 12/2002 | Ravet et al. | |
| 2004/0043294 A1* | 3/2004 | Fukui | B22F 7/08 429/235 |
| 2006/0051671 A1 | 3/2006 | Thackeray et al. | |
| 2006/0141358 A1* | 6/2006 | Yun | H01M 4/131 429/212 |
| 2007/0009799 A1 | 1/2007 | Zheng | |
| 2007/0131915 A1 | 6/2007 | Stankovich et al. | |
| 2008/0048153 A1 | 2/2008 | Naoi | |
| 2008/0254296 A1 | 10/2008 | Handa et al. | |
| 2009/0092747 A1 | 4/2009 | Zhamu et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0253045 A1 | 10/2009 | Kotato et al. | |
| 2009/0305135 A1 | 12/2009 | Shi et al. | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0144904 A1* | 6/2010 | Ellsworth | B82Y 30/00 516/98 |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0033746 A1 | 2/2011 | Liu et al. | |
| 2011/0070495 A1* | 3/2011 | Ban | H01M 4/131 429/221 |
| 2011/0111294 A1 | 5/2011 | Lopez et al. | |
| 2011/0111303 A1 | 5/2011 | Kung et al. | |
| 2011/0121240 A1 | 5/2011 | Amine et al. | |
| 2011/0136019 A1 | 6/2011 | Amiruddin et al. | |
| 2011/0159372 A1 | 6/2011 | Zhamu et al. | |
| 2011/0227000 A1 | 9/2011 | Ruoff et al. | |
| 2011/0229795 A1 | 9/2011 | Niu et al. | |
| 2012/0021273 A1 | 1/2012 | Ohmori et al. | |
| 2012/0045692 A1 | 2/2012 | Takemura et al. | |
| 2012/0058397 A1* | 3/2012 | Zhamu et al. | 429/231.8 |
| 2012/0064409 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0214065 A1 | 8/2012 | Yoshida et al. | |
| 2012/0225354 A1 | 9/2012 | Park et al. | |
| 2012/0308884 A1 | 12/2012 | Oguni et al. | |
| 2012/0315550 A1 | 12/2012 | Liu et al. | |
| 2013/0017443 A1 | 1/2013 | Yamazaki | |
| 2013/0045418 A1 | 2/2013 | Oguni et al. | |
| 2013/0084384 A1 | 4/2013 | Yamakaji | |
| 2013/0266859 A1 | 10/2013 | Todoriki et al. | |
| 2013/0266869 A1 | 10/2013 | Todoriki et al. | |
| 2015/0270548 A1 | 9/2015 | Nesper et al. | |

FOREIGN PATENT DOCUMENTS

| | | |
|---|---|---|
| CN | 1964917 A | 5/2007 |
| CN | 101094806 A | 12/2007 |
| CN | 101258628 A | 9/2008 |
| CN | 101562248 A | 10/2009 |
| CN | 101710619 A | 5/2010 |
| CN | 101752561 | 6/2010 |
| CN | 101849302 A | 9/2010 |
| CN | 101935036 A | 1/2011 |
| CN | 101941693 A | 1/2011 |
| CN | 101562248 | 5/2011 |
| CN | 102456869 A | 5/2012 |
| EP | 1011160 A | 6/2000 |
| EP | 1335438 A | 8/2003 |
| EP | 1 772 428 A1 | 4/2007 |
| EP | 2219249 A | 8/2010 |
| EP | 2 256 087 A1 | 12/2010 |
| EP | 2256087 * | 12/2010 |
| EP | 2 445 049 A1 | 4/2012 |
| EP | 2495788 A | 9/2012 |
| EP | 2 511 973 A1 | 10/2012 |
| JP | 06-060870 | 3/1994 |
| JP | 08-037007 A | 2/1996 |
| JP | 11-339777 A | 12/1999 |
| JP | 2003-238131 A | 8/2003 |
| JP | 2006-265751 A | 10/2006 |
| JP | 2007-042620 | 2/2007 |
| JP | 2008-526664 | 7/2008 |
| JP | 2009-500806 | 1/2009 |
| JP | 2009-524567 | 7/2009 |
| JP | 2009-176721 A | 8/2009 |
| JP | 2010-275186 | 12/2010 |
| JP | 2011-503804 | 1/2011 |
| JP | 2011-048992 | 3/2011 |
| JP | 2011-103255 A | 5/2011 |
| JP | 2011-517053 | 5/2011 |
| JP | 2011-105569 | 6/2011 |
| JP | 4765077 | 9/2011 |
| JP | 2012-064571 | 3/2012 |
| JP | 2012-094516 | 5/2012 |
| JP | 2012-099467 | 5/2012 |
| JP | 2012-099468 | 5/2012 |
| JP | 2012-182134 A | 9/2012 |
| JP | 2012-224526 | 11/2012 |
| JP | 2013-513904 | 4/2013 |
| JP | 2013-538933 | 10/2013 |
| KR | 2006-0077359 | 7/2006 |
| KR | 2007-0030274 | 3/2007 |
| KR | 2007-0056765 A | 6/2007 |

(56) References Cited

FOREIGN PATENT DOCUMENTS

| | | |
|---|---|---|
| KR | 2010-0088667 | 8/2010 |
| KR | 2010-0127729 | 12/2010 |
| KR | 2012-0047782 | 5/2012 |
| TW | 201111280 | 4/2011 |
| WO | WO-2005/121022 A1 | 12/2005 |
| WO | WO-2006/062947 | 6/2006 |
| WO | WO-2006/071076 A1 | 7/2006 |
| WO | WO-2007/004728 | 1/2007 |
| WO | WO-2007/008422 A2 | 1/2007 |
| WO | WO 2007/061945 | 5/2007 |
| WO | WO-2009/061685 A1 | 5/2009 |
| WO | WO-2009/085015 | 7/2009 |
| WO | WO-2009/127901 | 10/2009 |
| WO | WO-2009/144600 | 12/2009 |
| WO | WO-2010141348 A1 * | 12/2010 ............. B82Y 30/00 |
| WO | WO 2011026581 A1 * | 3/2011 |
| WO | WO-2011/057074 A2 | 5/2011 |
| WO | WO-2011/058417 | 5/2011 |
| WO | WO-2011/079238 A1 | 6/2011 |
| WO | WO-2011/141486 A1 | 11/2011 |
| WO | WO-2012/023464 A1 | 2/2012 |
| WO | WO-2012/046669 A1 | 4/2012 |
| WO | WO-2012/046791 A1 | 4/2012 |

OTHER PUBLICATIONS

Wullenkord et al. (Hydrogen Production by Thermal Cracking of Methane—Investigation of Reaction Conditions, 18th World Hydrogen Energy Conference 2010, pp. 199-204).*

Zhou.X et al., "Graphene modified LiFePO4 cathode materials for high power lithium ion batteries ,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

Padhi et al., "Phospho-Olivines as Positive-Electrode Materials for Rechargeable Lithium Batteries", Journal of the Electrochemical Society, Apr. 1, 1997, vol. 144, No. 4, pp. 1188-1194.

Paek.S et al., "Enhanced Cyclic Performance and Lithium Storage Capacity of SnO2/Graphene Nanoporous Electrodes with Three-Dimensionally Delaminated Flexible Structure,", Nano Letters, 2009, vol. 9, No, 1, pp. 72-75.

Wang.G et al., "Sn/graphene nanocomposite with 3D architecture for enhanced reversible lithium storage in lithium ion batteries,", J, Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion,", ACS Nano, 2009, vol. 3, No. 4, pp. 907-914.

International Search Report (Application No. PCT/JP2012/063569; PCT15343/15459/15469) dated Aug. 21, 2012.

Written Opinion (Application No. PCT/JP2012/063569; PCT15343/15459/15469) dated Aug. 21, 2012.

Chan.C et al., "High-performance lithium battery anodes using silicon nanowires,", Nature Nanotechnology, Dec. 16, 2007, vol. 3, pp. 31-35.

Todoriki.H et al., "High performance lithium ion battery using Graphene Net electrode", 222nd ECS Meeting Abstract, Oct. 7, 2012, p. 1014, ECS.

Dreyer.D et al., "The Chemistry of Graphene Oxide", Chemical Society Reviews, Nov. 3, 2009, vol. 39, No. 1, pp. 228-240.

Sundaram.R et al., "Electrochemical Modification of Graphene", Adv. Mater. (Advanced Materials), Jul. 7, 2008, vol. 20, No. 16, pp. 3050-3053.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Zhou.M et al., "Controlled Synthesis of Large-Area and Patterned Electrochemically Reduced Graphene Oxide Films", Chemistry A European Journal, May 14, 2009, vol. 15, No. 25, pp. 6116-6120.

Wang.Z et al., "Direct Electrochemical Reduction of Single-Layer Graphene Oxide and Subsequent Functionalization with Glucose Oxidase", J. Phys. Chem. C (Journal of Physical Chemistry C), 2009, vol. 113, No. 32, pp. 14071-14075.

Park.S et al., "Hydrazine-reduction of graphite-and graphene oxide", Carbon, Mar. 15, 2011, vol. 49, No. 9, pp. 3019-3023, Elsevier.

Shao.Y et al., "Facile and controllable electrochemical reduction of graphene oxide and its applications", J. Mater. Chem. (Journal of Materials Chemistry), 2010, vol. 20, No. 4, pp. 743-748.

Chinese Office Action (Application No. 201410487669.8) dated Sep. 11, 2015.

Chinese Office Action (Application No. 201410487669.8) dated Mar. 21, 2016.

Taiwanese Office Action (Application No. 101119533) dated Aug. 18, 2016.

Chinese Office Action (Application No. 201610219482.9) dated Sep. 4, 2017.

Chinese Office Action (Application No. 201610219482.9) dated May 9, 2018.

Korean Office Action (Application No. 2013-7033065) dated Jul. 5, 2018.

* cited by examiner

METHOD OF MANUFACTURING ELECTRODE

TECHNICAL FIELD

The present invention relates to a variety of electric appliances including a particulate material, particularly to power storage devices such as batteries and a variety of electric appliances including the power storage devices.

BACKGROUND ART

In a manganese battery, an alkaline battery, a nickel-hydride battery, a lithium battery, a lithium ion secondary battery, and the like, a particulate material is used as an active material for storing electricity, and a binder is necessary to bind such particles. A general binder is a polymer organic compound with extremely low conductivity. Therefore, a conduction auxiliary agent such as acetylene black, graphite particles, or carbon fibers is mixed into the material so as to increase the conductivity (see Patent Document 1).

Specifically, active material particles, the conduction auxiliary agent, and the binder are mixed, and the mixture is applied onto a current collector, molded, and then dried to be used as an electrode such as a positive electrode or a negative electrode. A similar procedure is applied to other electric appliances including a particulate material, without limitation to a battery.

In the case where the conductivity of active material particles themselves is low, it is necessary to add a larger amount of conduction auxiliary agent or to form a conductive film using carbon or the like over the surfaces of the active material particles (to carbon coat). Further, in the case where the ion conductivity of the active material particles is low in a power storage device utilizing ion conductivity (e.g., lithium ion secondary battery), it is necessary to use active material particles with a small particle size.

For example, lithium cobaltate has been used as a positive-electrode active material in a lithium ion secondary battery. Lithium cobaltate is preferably used as a positive-electrode active material in a lithium ion secondary battery because of its relatively high conductivity and ion conductivity. However, cobalt which is a material has modest deposits and is produced in limited regions, and thus has a problem in terms of price and stable supply.

In contrast, iron is inexpensive due to its abundant production, and Non-Patent Document 1 discloses that lithium iron phosphate which is obtained by using iron can serve as a positive electrode material of a lithium ion secondary battery. Lithium iron phosphate, however, has lower lithium ion conductivity and electric conductivity than lithium cobaltate, and thus needs to be carbon coated and be microparticles with an average particle size of 150 nm or less, preferably 20 nm to 100 nm. Note that the particle size is the size of a primary particle.

However, since such microparticles are likely to aggregate, it is difficult to mix lithium iron phosphate particles and a conduction auxiliary agent uniformly. To prevent the particles from aggregating, the proportion of the conduction auxiliary agent needs to be increased, but the increase makes it difficult to maintain the form of an electrode and the proportion of a binder also needs to be increased, resulting in a reduction in storage capacity.

In the case where graphite particles are used as the conduction auxiliary agent, natural graphite is generally used by reason of cost. However, in that case, iron, lead, copper, or the like contained in the graphite particles as an impurity reacts with an active material or a current collector, so that the potential and the capacity of the battery are decreased.

Acetylene black contains fewer impurities and has a better developed chain structure than graphite particles and therefore has excellent electrolyte retention characteristics, thereby improving the use efficiency of an active material. However, since a particle of acetylene black is a microparticle with a diameter of about 10 nm, current is conducted from the lithium iron phosphate particles by hopping between individual acetylene black particles or acetylene black particle groups.

That is, every time the hopping occurs, the resistance is increased and the discharging voltage is decreased when the power storage device releases electricity, i.e., a voltage drop occurs. The above problem is also caused in the case where graphite particles are used. FIG. 2A illustrates a schematic cross-sectional view of an electrode including acetylene black as a conduction auxiliary agent.

As described above, microparticles of active material particles are likely to aggregate and unlikely to be mixed with a binder or acetylene black uniformly (or to be dispersed in a binder uniformly). Therefore, a portion where active material particles are concentrated (portion where the active material particles aggregate) and a portion where active material particles are thinly distributed are generated, resulting in a reduction in the proportion of the active material in the electrode. Further, the portion where the active material particles are concentrated includes a portion where acetylene black or the like does not exist, so that the conductivity in that portion is low and an active material that cannot contribute to capacity is generated.

FIG. 2B shows a SEM image of a positive electrode of a conventional ion secondary battery. In a general conventional electrode, the proportion a material other than the active material has been 15% or higher. To increase the capacity of a battery, it is necessary to reduce the weight or volume of the material other than the active material. It is also necessary to take measures to prevent the material other than the active material (especially a binder) from swelling because the swelling might cause deformation or breakdown of the electrode.

REFERENCE

Patent Documents

[Patent Document 1] Japanese Published Patent Application No. H6-60870
[Patent Document 2] United States Published Patent Application No. 2009/0110627
[Patent Document 3] United States Published Patent Application No. 2007/0131915

Non-Patent Document

[Non-Patent Document 1] Padhi et al., "Phospho-olivines as positive-electro materials for rechargeable lithium batteries", J. Electrochem. Soc. 144, 1188-1194 (1997).

DISCLOSURE OF INVENTION

In view of the above problems, an object of one embodiment of the invention is to provide a battery with larger electric capacity, an electric appliance with excellent electric characteristics, or an electric appliance with high reliability, i.e., an electric appliance with durability for long-term use.

Another object of one embodiment of the invention is to provide a power storage device which can prevent a voltage drop from being generate.

By mixing net-like graphene (hereinafter also referred to as graphene net) formed of a stack of 1 to 100 graphene sheets and active material particles, either conductivity or a bond between the active material particles; or both, can be increased. Here, the net-like graphene includes two-dimensional graphene and three-dimensional graphene. The average particle size of the active material particles is 150 nm or less, preferably 20 nm to 100 nm. Further, the graphene net includes a hole through which ions can pass.

Note that in this specification, graphene refers to a one-atom-thick sheet of carbon molecules having $sp^2$ bonds. Further, graphite refers to plural graphene sheets bonded to one another by the Van der Waals force. Among elements included in the graphene net, the proportion of elements other than hydrogen and carbon is preferably 15 atomic % or lower, or the proportion of elements other than carbon is preferably 30 atomic % or lower.

FIG. 1A is a schematic cross-sectional view of an electrode including graphene nets each having such an expansion. In FIG. 1A, a plurality of graphene nets and a plurality of active material particles are illustrated. Although it is not clear in the figure, a single layer or multilayer of graphene are bonded at a plurality of portions to form a complicated structure (graphene net) and increase the conductivity. Further, the active material particles tangle in the graphene nets, so that the active material particles can be bonded to one another.

The graphene net has a two-dimensional expansion and also a three-dimensional structure including a depression or projection, so that the active material particles included in one or a plurality of graphene nets. That is, the plurality of active material particles exists within one graphene net or among a plurality, of graphene nets.

Note that the graphene net has a bag-like shape, and might include the plurality of active material particles inside the bag-like portion. Further, the graphene net partly has an open portion where the active material particles may be exposed. The graphene net can prevent the active material particles from dispersing and collapsing.

As a result, the graphene net has a function of maintaining the bond between the active material particles even when the volume of the active material particles is increased and decreased by charging and discharging. Further, since the graphene is in contact with the plurality of active material particles, the conductivity of the electrode can be increased.

The bag-like portion of the graphene net can be filled with the active material particles. As described above, the graphene net is formed of a stack of limited number of graphene sheets, and thus is very thin; accordingly, a cross-section thereof is linear.

FIG. 1B shows a SEM image of an electrode in a state where such graphene nets are mixed with active material particles. Details of a method of manufacturing this electrode will be described later. As shown in FIG. 1B, the surfaces of the active material particles are covered with film-like graphene nets, so that individual particles are difficult to recognize.

In the figure, particles are bonded to one another via the graphene net(s). That is, one of the active material particles and another one of the active material particles are covered with one of the graphene nets. The graphene net serves as a binder binding the active material particles. Since the active material particles are bonded to one another via the graphene net(s), electricity can be conducted between the active material particles via the graphene net(s).

Needless to say, the graphene net is also in contact with a current collector, thereby binding the current collector and the active material particles. In that case, electricity can also be conducted between the current collector and the active material particles via the graphene net.

In this manner, the graphene net which has a two-dimensional expansion and whose thickness is negligible can serve as both the conduction auxiliary agent and the binder. As a result, even when the content of graphene nets is low, sufficient conductivity can be secured. Further, by reducing the distance between different graphene nets; the resistance therebetween can be lowered, resulting in a reduction in voltage drops.

As a result, the content of the conduction auxiliary agent, such as acetylene black, or the binder, which has been necessary so fat, can be reduced. Depending on the case, an electrode can be formed without using the conduction auxiliary agent or binder, which has been necessary so far. Therefore, the volume proportion or the weight proportion of the active material in the electrode can be increased.

The graphene net is formed by stacking 1 to 100 graphene sheets and can have a particularly high conductivity of $1 \times 10^5$ S/cm or higher when subjected to doping treatment. This is advantageous in using the graphene net as a conduction auxiliary agent. The doping treatment can be performed by adding an alkali metal such as potassium.

The graphene net has high flexibility and high mechanical strength. Further, since the graphene net includes the active material particles as illustrated in FIG. 1B, the bond between the active material particles can be maintained even when the volume of the active material particles is increased and decreased by charging and discharging.

The graphene net has higher heat resistance than an organic material generally used as the binder. Therefore, when the graphene net is used as an electrode material, it is possible to evaporate water from the electrode by heat treatment at 300° C. or higher and reduce the water concentration sufficiently. Further, the graphene net hardly absorbs an electrolyte, so that it is possible to suppress deformation or breakdown of the electrode owing to swelling of the graphene net in the electrolyte.

Besides the graphene net, the electrode may include acetylene black particle having a volume 0.1 to 10 times as large as the graphene net, carbon particles having a one-dimensional expansion (e.g., a carbon nanofiber), or other known binders.

Another embodiment of the invention is a power storage device including an electrode in which a plurality of graphene nets includes a plurality of active material particles and the distance between the plurality of graphene nets with the plurality of active material particles placed therebetween is short.

Another embodiment of the invention is a method of manufacturing an electric appliance including the following steps: mixing a precursor of a graphene net with active material particles; and heating the mixture in a vacuum or a reducing atmosphere. Another embodiment of the invention is a method of manufacturing an electric appliance including the following steps: mixing a precursor of a graphene net with active material particles; and reducing the mixture by using a reducing material.

As the precursor of the graphene net, it is possible to use graphene oxide having a single-layer or multilayer structure. In that case, the precursor does not particularly need to have a large expansion or be a high molecular compound, but precursors are bonded to each other in the heating step, resulting in polymerization or formation of a high molecule, and formation of a larger, three-dimensional network.

Note that the graphene net in this specification does not necessarily have a two-dimensional structure in a strict sense, and may partly have a three-dimensional structure. For example, one, graphene net can be formed by binding a graphene sheet to a portion of another graphene sheet.

The structure in which the graphene nets exist among the active material particles can increase at least one of the conductivity, a bond between the active material particles, and dispersion of the active material particles. Further, the ion conductivity can be increased, and an electric appliance with fewer voltage drops and large storage capacity can be manufactured.

The above structure can increase the density of the active material or the electrode, reduce the resistance between the active material and the current collector, and suppress voltage drops. In particular, in a case of a primary battery or a secondary battery, it is more preferable that the resistance (internal resistance) or an electrode be lower, which is suitable for applications where a large amount of power is required instantaneously. The above structure is suitably used to achieve that object.

For example, a power source of an electric vehicle consumes a relatively small amount of power when the electric vehicle is driven on flatland. However, a large amount of power is consumed under hard acceleration or in ascending a slope. In that case, the power source needs to feed a large amount of current; however, when internal resistance is high, a significant voltage drop and also a loss due to internal resistance are caused. Further, in that case, the loss is increased when the weight of a battery is large.

As a result, part of the power which is expected to be available is lost under such circumstances. For example, when a secondary battery is used as the power supply, although stored power can be almost fully used if the vehicle is driven on flatland, part of the power is lost in ascending a slope or under acceleration. Such a loss can be suppressed by lowering the internal resistance and reducing the weight of the battery (or increasing the battery capacity).

Note that sufficient characteristics can be obtained by using active material particles whose surfaces are not carbon coated, but it is preferable to use carbon coated active material particles or active material particles with high conductivity together with the graphene net.

BEST MODE FOR CARRYING OUT THE INVENTION

Figure 1A:
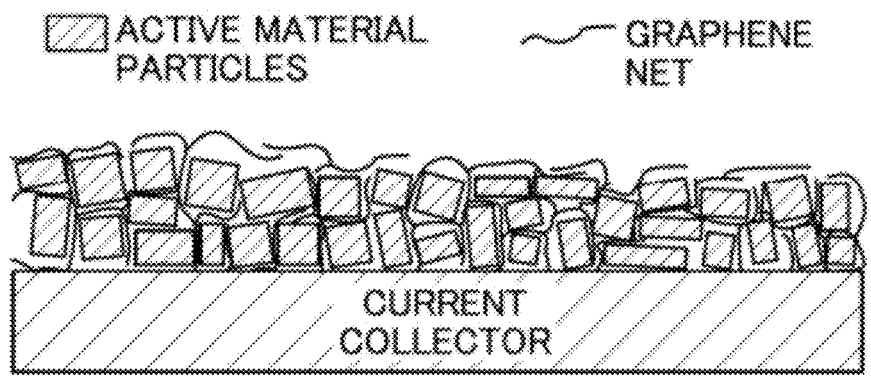
FIG. 1A is a schematic cross-sectional view of graphene nets and active material particles.
Figure 1B:
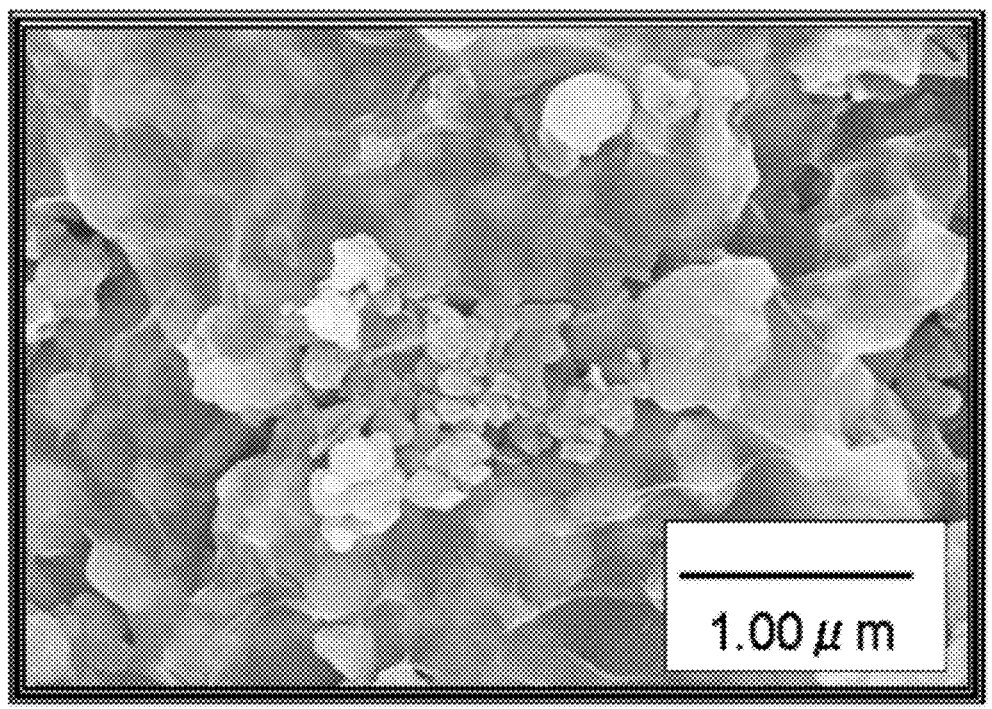
FIG. 1B is a SEM image thereof.
Figure 2A:
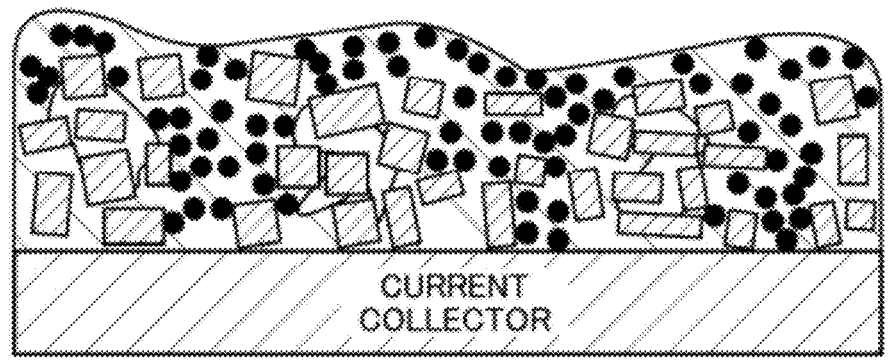
FIG. 2A is a schematic cross-sectional view of a conventional conduction auxiliary agent (acetylene black particles) and active material particles.
Figure 2B:
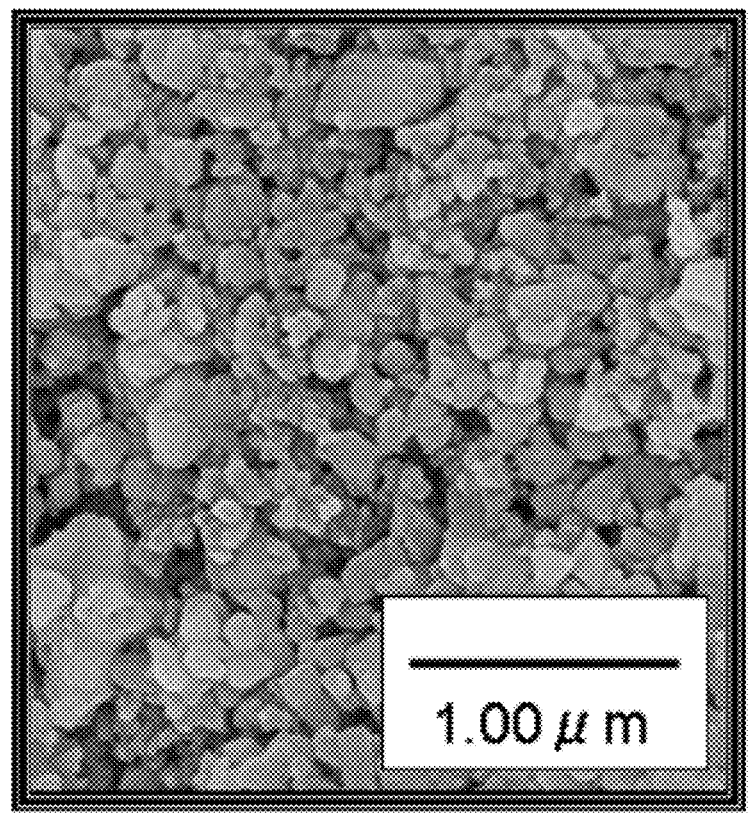
FIG. 2B is a SEM image thereof.

Hereinafter, embodiments will be described with reference to drawings. However, the embodiments can be implemented with various modes. It will be readily appreciated by those skilled in the art that modes and details can be changed in various ways without departing from the spirit and scope of the invention. Thus, the invention should not be interpreted as being limited to the following description of the embodiments.

Embodiment 1

This embodiment will show a method of manufacturing a lithium ion secondary battery which is one embodiment of the invention. The method of manufacturing an electrode of the lithium ion secondary battery includes a step of mixing a precursor of a graphene net with active material particles, and applying the mixture onto a current collector, and a step of heating this mixture in a vacuum or a reducing atmosphere. As the precursor of the graphene net graphene oxide (or multilayer graphene oxide) can be used.

The precursor of the graphene net does not particularly need to have a large expansion or be a high molecular compound, but precursors are bonded to each other in the heating step, resulting in polymerization or formation of a high molecule, formation of a larger, three-dimensional network, and formation of the graphene net.

The following shows details. In this embodiment, an oxidation method called Hummers method is used. First, graphite such as flake graphite is oxidized to give graphite oxide. The graphite oxide refers to graphite which is oxidized in places and to which a functional group such as a carbonyl group, a carboxyl group, or a hydroxyl group is bonded. In the graphite oxide, the crystallinity of the graphite is lost and the distance between pieces of graphene is increased. Therefore, graphite oxide layers are easily separated from each other by ultrasonic treatment or the like.

As a result, graphene oxide in which 1 to 100 carbon sheets (corresponding to graphene) are stacked is obtained. Note that the periphery of graphene oxide is terminated by a functional group, whereby the graphene oxide can be suspended in a polar solvent such as water, chloroform, N,N-dimethylformamide (DMF), or N-methylpyrrolidone (NMP). The solution containing the graphene oxide which has been subjected to the ultrasonic treatment is dried to give graphene oxide powder.

The graphene oxide obtained in this manner is mixed with active material particles with an average particle size of 150 nm or less, preferably from 20 nm to 100 nm. The active material particles are mixed such that the proportion thereof in the mixture becomes 90% or higher, preferably 95% or higher. Before the mixing, only graphene oxide is preferably suspended in a solvent such as water or NMP. After that, the active material particles are mixed into the suspension to give a slurry. Another conduction auxiliary agent such as acetylene black or a binder may be additionally mixed as appropriate.

Further, a carbohydrate such as glucose may be mixed so that the active material particles are coated with carbon at the time of later-performed baking. Needless to say, active material particles that are already coated with carbon may alternatively be used.

A variety of materials can be used as the active material. Examples of a positive electrode active material include, but are not limited to, lithium compounds such as lithium cobaltate, lithium ferrate, lithium nickel oxide, and lithium manganate, and lithium-containing composite oxides such as lithium iron phosphate, lithium manganese phosphate, lithium manganese silicate, and lithium iron silicate.

Note that lithium iron phosphate refers to an oxide containing lithium, phosphorus, and iron. Lithium iron phosphate preferably has an olivine structure. When lithium iron phosphate is used as an active material, the concentration of lithium differs significantly depending on charging and discharging conditions. Therefore, the ratio of phosphorus to iron is important for lithium iron phosphate used as an active material, and the most ideal ratio of the number of phosphorus atoms to the number of iron atoms is 1. However, the ratio of the number of phosphorus atoms to the number of iron atoms may be higher than or equal to 0.7 and lower than or equal to 1.5. The same applies to other lithium-containing composite oxides.

In a lithium ion secondary battery, carrier ions are lithium ions. In the case of a metal ion secondary battery in which the carrier ions are alkali metal ions other than lithium ions, alkaline earth metal ions, magnesium ions, of the like, a positive electrode active material may include, instead of lithium in the lithium compound and the lithium-containing composite oxide, an alkali metal (e.g., sodium or potassium), an alkaline earth metal (e.g., calcium, strontium, or barium), or magnesium.

Note that the lithium-containing composite oxide having an olivine structure can be expressed, as general formula $LiMPO_4$ (M is at, least one of Fe(II), Mn(II), Co(II), and Ni(II), or general formula $Li_{(2-j)}MSiO_4$ (M is at least one of Fe(II), Mn(II), Co(II), and Ni(II), $0 \leq j \leq 2$).

The obtained slurry is applied onto a current collector. The thickness can be set as appropriate, and is preferably 1 μm to 1 mm. Then, the slurry is dried. The drying may be followed by pressing as needed.

After that, in order to cause reduction, the graphene oxide is heated in a vacuum or a reducing atmosphere such as nitrogen or argon at 150° C. to 900° C. The heating, may be performed in the air depending on the temperature. The temperature is set in accordance with the heat resistance of the current collector or the active material, the conductivity required for the graphene oxide, or the like. As a result of the inventors experiments, it turns out that the reduction of the heated graphene oxide proceeds rapidly at 170° C. to 200° C.

Figure 3A:
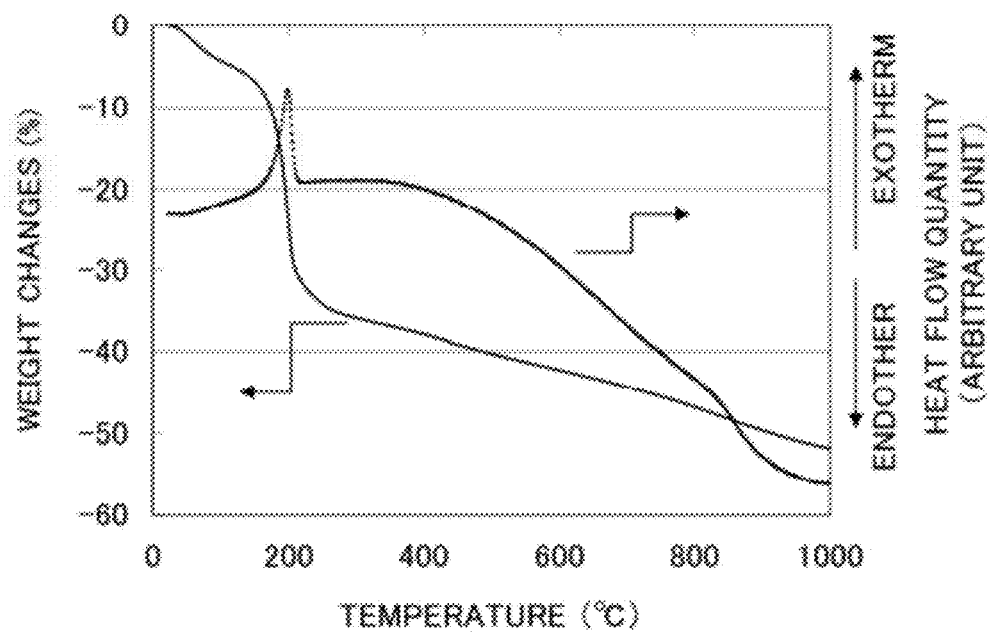
FIG. 3A shows weight changes and differential thermal changes of graphene oxide due to heat.

FIG. 3A shows weight changes (solid line) and differential thermal changes (dotted line) of graphene oxide which is formed in the above manner and heated in a helium atmosphere from room temperature to 1000° C. at a temperature rising rate of 2° C./min. A heat generation peak accompanied by a significant reduction in weight is seen at around 200° C., indicating a certain chemical change.

Figure 3B:
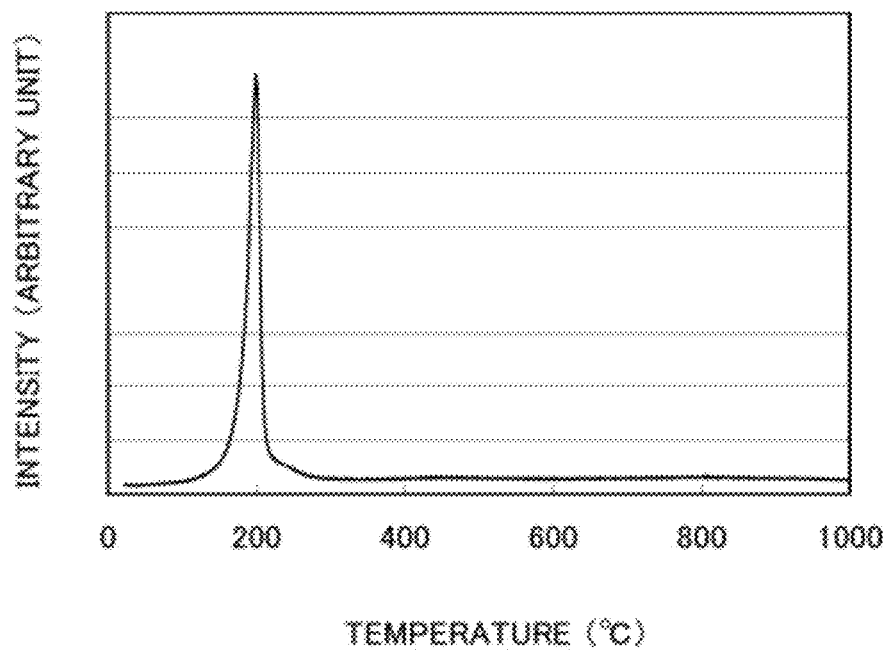
FIG. 3B shows the amount of released carbon dioxide.

Molecules released in the above measurement are analyzed by mass spectrometry. From the results, FIG. 3B shows the amount of released molecules having a mass number of 44 (presumed to be carbon dioxide). An immediate release of molecules having a mass number of 44 is also seen at around 200° C.

Although not shown in FIGS. 3A and 3B, significantly large amounts of molecules having a mass number of 12 (carbon atoms which might have been generated by decomposition of molecules containing carbon in the mass spectrometry), molecules having a mass number of 16 (presumed to be oxygen atoms), and molecules having a mass number of 18 (presumed to be water) are also seen at around 200° C., indicating that oxygen and hydrogen as well as carbon are released from the graphene oxide at this temperature; in other words, it is indicated that reduction occurs at this temperature.

Since graphite is treated with sulfuric acid according to the Hummers method, a sulfone group and the like are also bonded to the multilayer graphene oxide, and its decomposition (release), turns out to start at around 200° C. to 300° C. Therefore, graphene oxide is preferably reduced at 200° C. or higher, more preferably at 300° C. or higher.

Higher temperature enhances the reduction and increases the proportion of carbon in the graphene net to be formed. Further, more defects are repaired and the conductivity is enhanced. From the inventors' measurement, for example, the resistivity of the graphene net is approximately 240 MΩ·cm at a heating temperature of 100° C., approximately 4 kΩ·cm at a heating temperature of 200° C., and approximately 2.8 Ω·cm at a heating temperature of 300° C. (each value is measured by the van der Pauw method).

It this reduction process, graphene oxide molecules are bonded to adjacent graphene oxide molecules, so that larger graphene molecules are obtained and a three-dimensional network like a net is formed. At this time, active material particles are tangled in the molecules, resulting in higher bonding strength between the active material particles.

Depending on the reduction temperature, the conductivity of the graphene nets changes as described above; in addition, its flexibility, strength, and the like also change. The reduction temperature may be set in accordance with the required conductivity, flexibility, strength, and the like. In the case where the conductivity of graphene nets used as a binder is not sufficiently high, a required amount of a known conduction auxiliary agent is preferably added so as to increase the conductivity.

Figure 4:
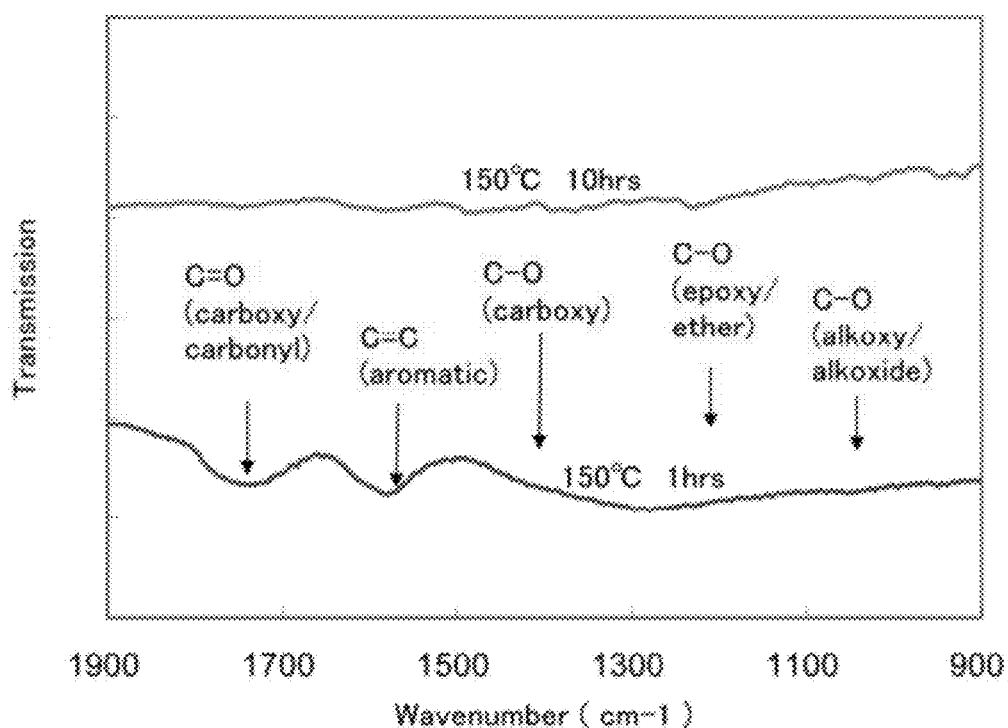
FIG. 4 shows changes of infrared spectra of graphene oxide due to heat.

As a result of inventors examinations, it has turned out that a long-time heating treatment even at 150° C. enhances reduction. FIG. 4 shows results of infrared spectroscopy (transmittances) in the cases where graphene oxide is heated at 150° C. for 1 hour and for 10 hours. In the case where the heating at 150° C. is performed only for 1 hour, much absorption occurs due to a C=O bond, a C=C bond, a C—O bond, and the like. In contrast, in the case where the heating at 150° C. is performed for 10 hours, less absorption occurs due to the above carbon and oxygen bonds.

Figure 5:
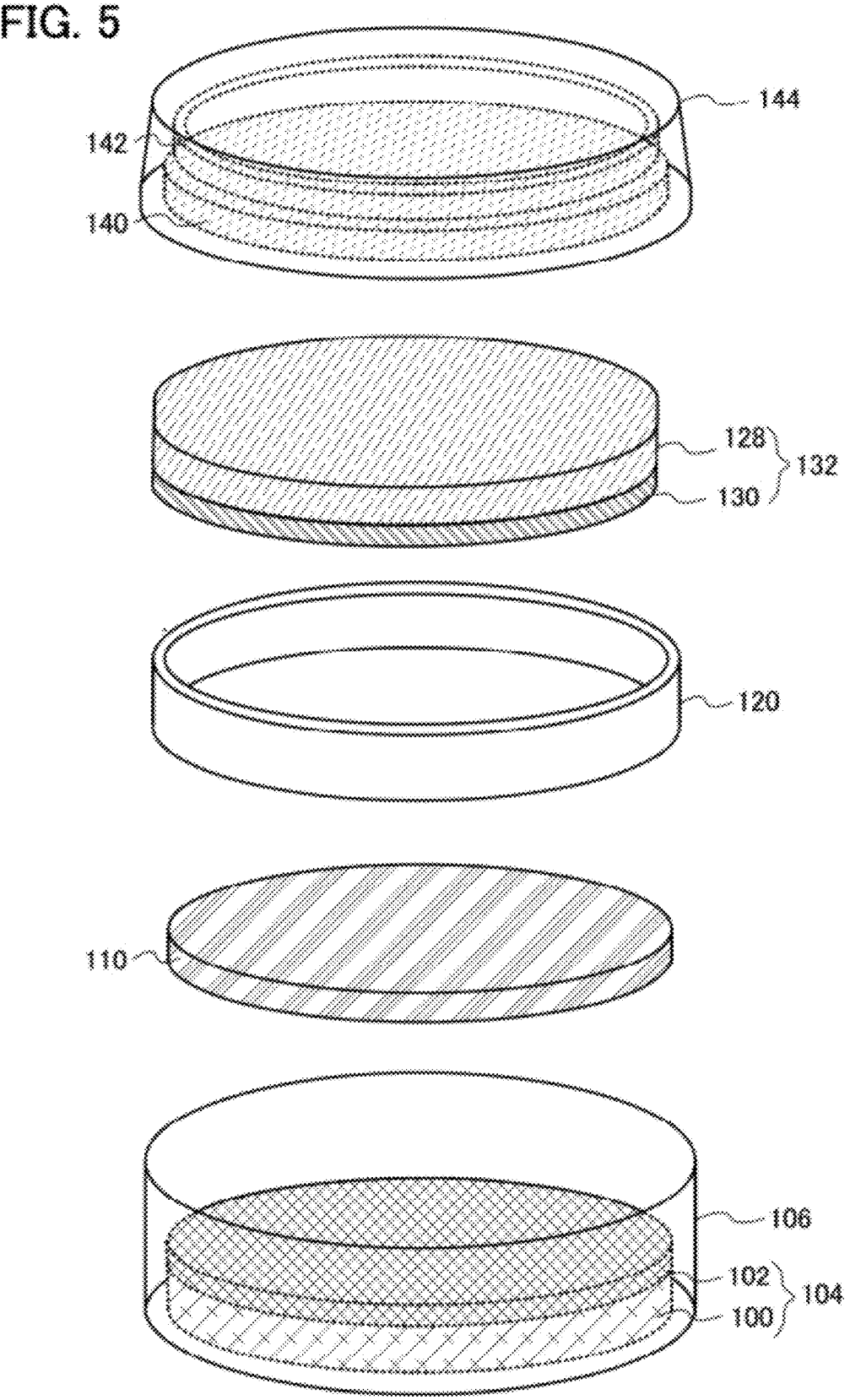
FIG. 5 illustrates an example of a secondary battery.

FIG. 5 is a schematic view illustrating the structure of a coin-type secondary battery. The above slurry is applied onto a positive electrode current collector 128, molded, and then dried and reduced, whereby a positive electrode active material layer 130 is formed. As a material for the positive electrode current collector 128, aluminum is preferably used. In that case, the reduction temperature ranges from 200° C. to 600° C., and is 300° C. for example.

As illustrated in FIG. 5, the coin-type secondary battery includes a negative electrode 104, a positive electrode 132, a separator 110, an electrolyte (not illustrated), a housing 106, and a housing 144. Besides, the coin-type secondary battery includes a ring-shaped insulator 120, a spacer 140, and a washer 142. As the positive electrode 132, the electrode that is obtained in the above step by forming the positive electrode active material layer 130 over the positive electrode current collector 128 is used.

It is preferable to use, without limitation, an electrolyte in which $LiPF_6$ is dissolved in a mixed solvent of ethylene carbonate (EC) and diethyl carbonate (DEC).

The negative electrode 104 includes a negative electrode active material layer 102 over a negative electrode current collector 100. As the negative electrode current collector 100, copper may be used, for example. The negative electrode active material layer 102 is preferably formed using, as a negative electrode active material, metallic lithium, graphite, polyacene, silicon, or the like alone or in combination with a binder.

An insulator with pores (e.g., polypropylene) may be used for the separator 110. Alternatively, a solid electrolyte which can transmit lithium ions may be used.

The housing 106, the housing 144, the spacer 140, and the washer 142 each of which is made of metal (e.g., stainless steel) are preferably used. The housing 106 and the housing 144 have a function of electrically connecting the negative electrode 104 and the positive electrode 132 to an external unit.

The negative electrode 104, the positive electrode 132, and the separator 110 are soaked in the electrolyte. Then, as illustrated in FIG. 5, the negative electrode 104, the separator 110, the ring-shaped insulator 120, the positive electrode 132, the spacer 140, the washer 142, and the housing 144 are stacked in this order with the housing 106 positioned at the bottom. The housing 106 and the housing 144 are subjected to pressure bonding. In such a manner, the coin-type lithium-ion secondary battery is manufactured.

Embodiment 2

Examples of electric appliances according to the invention include a variety of dry batteries, storage batteries, and the like. As an additive to their positive electrodes or negative electrodes, for example, the graphene net described in Embodiment 1 may be used.

Examples of electric appliances according to the invention further include electric power tools, personal computers, mobile phones, mobile game machines, mobile information terminals, e-book readers, video cameras, digital still cameras, and the like. Such electric appliances are not always supplied with power by a wire and therefore include a storage battery inside. As an additive to positive electrodes or negative electrodes of the storage batteries, for example, the graphene net described in Embodiment 1 may be used.

In particular, a storage battery with low internal resistance is required for applications where a large amount of current needs to be fed instantaneously or where a required current value varies greatly. Therefore, a sufficient effect can be obtained by using the invention. Further, a storage battery with large electric capacity is required for devices that are carried or moving devices. Therefore, a sufficient effect can be obtained by using the invention.

Besides, specific examples of electronic and electric appliances including the power storage device according to one embodiment of the invention include the following: display devices, lighting devices, image reproduction devices which reproduce a still image or a moving image stored in a recording medium such as a digital versatile disc (DVD), high-frequency heating apparatus such as microwaves, electric rice cookers, electric washing machines, air-conditioning systems such as air conditioners, electric refrigerators, electric freezers, electric refrigerator-freezers, freezer for preserving DNA, dialysis devices, and the like.

In addition, moving objects driven by an electric motor using power from a power storage device are also included in the category of electronic and electric appliances. As examples of the moving objects, electric vehicles, hybrid vehicles which include both an internal-combustion engine and a motor, motorized bicycles including motor-assisted bicycles, and the like can be given.

In the electronic and electric appliances, the power storage device according to one embodiment of the invention can be used as a power storage device for supplying enough power for almost the whole power consumption (referred to as main power supply). Alternatively, in the electronic and electric appliances, the power storage device according to one embodiment of the invention can be used as a power storage device which can supply power to the electronic and electric appliances when the supply of power from a commercial power supply is stopped (such a power storage device is referred to as uninterruptible power supply).

Further alternatively, in the electronic and electric appliances, the power storage device according to one embodiment of the invention can be used as a power storage device for supplying power to the electronic and electric appliances at the same time as the power supply from the main power supply or a commercial power supply (such a power storage device is referred to as auxiliary power supply).

Figure 10:
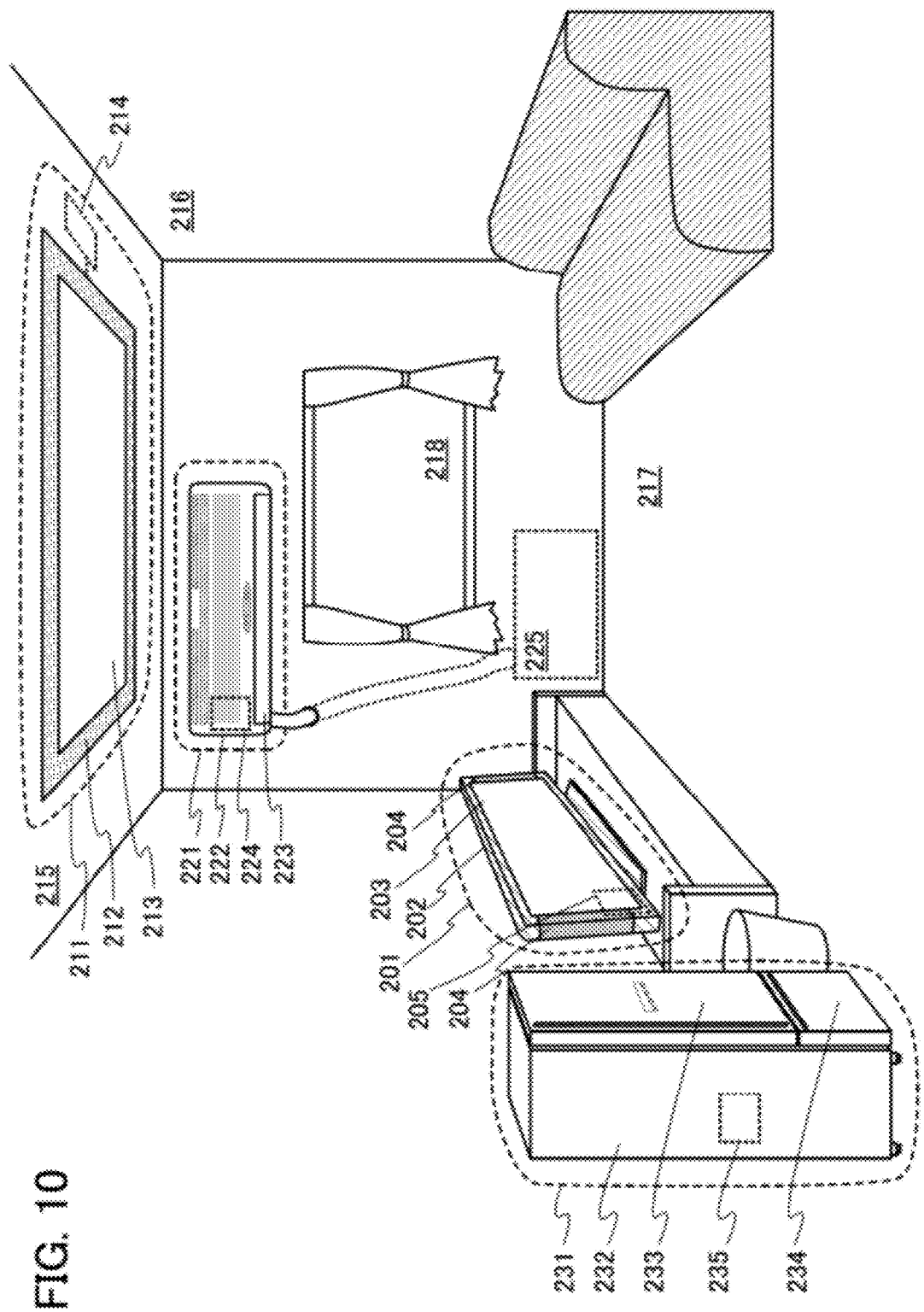
FIG. 10 illustrates application examples of a power storage device.

FIG. 10 illustrates specific structures of the electronic and electric appliances. In FIG. 10, a display device 201 is an example of an electronic and electric appliance including a power storage device 205 according to one embodiment of the invention. Specifically, the display device 201 corresponds to a display device for TV broadcast reception and includes a housing 202, a display portion 203, speaker, portions 204, the power storage device 205, and the like. The power storage device 205 according to one embodiment of the invention is provided inside the housing 202.

The display device 201 can receive power from commercial power supply. Alternatively, the display device 201 can use power stored in the power storage device 205. Thus, the display device 201 can be operated with the use of the power storage device 205 according to one embodiment of the invention as an uninterruptible power supply even when power cannot be supplied from the commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 203.

Note that the display device includes, in its category, all of information display devices for personal computers, advertisement displays, and the like other than TV broadcast reception.

In FIG. 10, an installation lighting device 211 is an example of an electric appliance including a power storage device 214 according to one embodiment of the invention. Specifically, the lighting device 211 includes a housing 212, a light source 213, the power storage device 214, and the like. FIG. 10 illustrates the case where the power storage device 214 is provided in a ceiling 215 on which the housing 212 and the light source 213 are installed; alternatively, the power storage device 214 may be provided in the housing 212.

The lighting device 211 can receive power from the commercial power supply. Alternatively, the lighting device 211 can use power stored in the power storage device 214.

Thus, the lighting device 211 can be operated with the use of the power storage device 214 according to one embodiment of the invention as an uninterruptible power supply even when power cannot be supplied from the commercial power supply due to power failure or the like.

Note that although the installation lighting device 211 provided in the ceiling 215 is illustrated in FIG. 10 as an example, the power storage device according to one embodiment of the invention can be used in an installation lighting device provided in, for example, a wall 216, a floor 217, a window 218, or the like other than the ceiling 215. Alternatively, the power storage device can be used in a tabletop lighting device and the like.

As the light source 213, an artificial light source which provides light artificially by using power can be used. Specifically, a discharge lamp such as an incandescent lamp and a fluorescent lamp, and a light-emitting element such as an LED and an organic EL element are given as examples of the artificial light source.

In FIG. 10, an air conditioner including an indoor unit 221 and an outdoor unit 225 is an example of an electric appliance including a power storage device 224 according to one embodiment of the invention. Specifically, the indoor unit 221 includes a housing 222, a ventilation duct 223, the power storage device 224, and the like. FIG. 10 illustrates the case where the power, storage device 224 is provided in the indoor unit 221; alternatively, the power storage device 224 may be provided in the outdoor unit 225. Further alternatively, the power storage device 224 may be provided in each of the indoor unit 221 and the outdoor unit 225.

The air conditioner can receive power from the commercial power supply. Alternatively, the air conditioner can use power stored in the power storage device 224. In particular, in the case where the power storage devices 224 are provided in both the indoor unit 221 and the outdoor unit 225, the air conditioner can be operated with the use of the power storage device 224 according to one embodiment of the invention as an uninterruptible power supply even when power cannot be supplied from the commercial power supply due to power failure or the like.

Note that although the separated conditioner including the indoor unit and the outdoor unit is illustrated in FIG. 10 as an example, the power storage device according to one embodiment of the invention can be used in an air conditioner in which the functions of an indoor unit and an outdoor unit are integrated in one housing.

In FIG. 10, an electric refrigerator-freezer 231 is an example of an electric appliance including a power storage device 235 according to one embodiment of the invention. Specifically, the electric refrigerator-freezer 231 includes a housing 232, a door for a refrigerator 233, a door for a freezer 234, the power storage device 235, and the like. The power storage device 235 is provided in the housing 232 in FIG. 10. The electric refrigerator-freezer 231 can receive power from the commercial power supply. Alternatively, the electric refrigerator-freezer 231 can use power stored in the power storage device 235. Thus, the electric refrigerator-freezer 231 can be operated with the use of the power storage device 235 according to one embodiment of the invention as an uninterruptible power supply even when power cannot be supplied from the commercial power supply due to power failure or the like.

Note that among the electronic and electric appliances described above, a high-frequency heating apparatus such as a microwave and an electric appliance such as an electric rice cooker require high power in a short time. The tripping of a circuit breaker of a commercial power supply in use of electric appliances can be prevented by using the power storage device according to one embodiment of the invention as an auxiliary power supply for supplying power which cannot be supplied enough by a commercial power supply.

In addition, in a time period when electronic and electric appliances are not used, specifically when the proportion of the amount of power which is actually used to the total amount of power which can be supplied by a commercial power supply source (such a proportion referred to as usage rate of power) is low, power can be stored in the power storage, device, whereby the usage rate of power can be reduced in a time period when the electronic and electric appliances are used. In the case of the electric refrigerator-freezer 231, power can be stored in the power storage device 235 at night time when the temperature is low and the door for a refrigerator 233 and the door for a freezer 234 are not opened or closed. Meanwhile, the power storage device 235 is used as an auxiliary power supply in daytime when the temperature is high and the door for a refrigerator 233 and the door for a freezer 234 are opened and closed; thus, the usage rate of power in daytime can be reduced.

Example 1

To investigate the effect of a graphene net obtained by reducing graphene oxide, the following two samples were fabricated and their characteristics were compared. Sample A was fabricated by applying a mixture of only active material (lithium iron phosphate) particles and graphene oxide onto a current collector (aluminum) and heating the mixture in a vacuum.

Sample B was fabricated by applying a mixture of active material (lithium iron phosphate) particles, a binder (polyvinylidene fluoride (PVDF) produced by KUREHA CORPORATION), and a conduction auxiliary agent (acetylene black produced by DENKI KAGAKU KOGYO KABUSHIKI KAISHA) onto a current collector (aluminum) and drying the mixture. The active material particles and the current collector were the same as those of Sample A.

The lithium iron phosphate particles and the graphene oxide were obtained as follows. First, lithium carbonate ($Li_2CO_3$), iron oxalate ($Fe(C_2O_4).2H_2O$), and ammonium dihydrogen phosphate ($NH_4H_2PO_4$) were weighed out such that the molar ratio therebetween was 1:2:2, and were ground and mixed with a wet ball mill (the ball diameter was 3 mm and acetone was used as a solvent) at 400 rpm for 2 hours.

After the drying, pre-baking was performed at 350° C. for 10 hours, in a nitrogen atmosphere, and the grinding and mixing were performed again with the wet ball mill (the ball, diameter was 3 mm) at 400 rpm for 2 hours. Then, baking was performed at 600° C. for 10 hours in a nitrogen atmosphere. The lithium iron phosphate particles obtained in that manner were not coated with carbon.

The graphene oxide was prepared as follows. Potassium permanganate was added to a mixture of graphite (flake carbon) and concentrated sulfuric acid, and stirred for 2 hours. After that, pure water was added to the mixture, and the mixture including the pure water was stirred for 15 minutes while being heated. Then, hydrogen peroxide was further added to the mixture, so that a yellow brown solution including graphite oxide was obtained. Further, this solution was filtered and hydrochloric acid was added, followed by washing with pure water. Next, ultrasonic treatment was performed for 2 hours, so that the graphite oxide was processed into the graphene oxide.

The following shows detailed conditions for fabricating the samples. Sample A was obtained by mixing 3 wt % graphene oxide and 97 wt % active material particles with NMP having a weight about twice as large as the total weight of the graphene oxide and the active material particles, applying the mixture onto a current collector of aluminum (with a thickness of 20 μm), forced-air drying the mixture at 120° C. for 15 minutes, and heating the mixture at 300° C. for 8 to 10 hours in a vacuum.

Sample B was obtained by mixing 85 wt % active material particles, a 7 wt % binder, and a 8 wt % conduction auxiliary agent with MAP having a weight about twice as large is the total weight of the active material particles, the binder, and the conduction auxiliary agent, applying the mixture onto a current collector of aluminum (with a thickness of 20 μm), forced-air dying the mixture at 120° C. for 15 minutes, and heating the mixture at 180° C. for 10 hours in a vacuum.

Figure 6A:
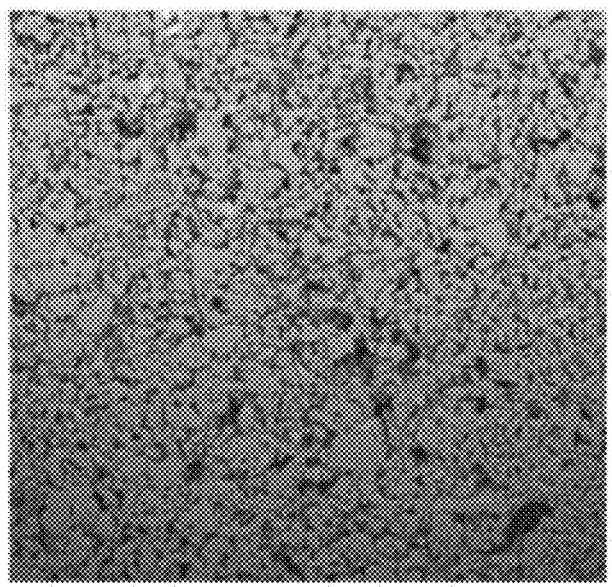
FIGS. 6A and 6B are cross-sectional SEM images of electrodes fabricated in Example.
Figure 6B:
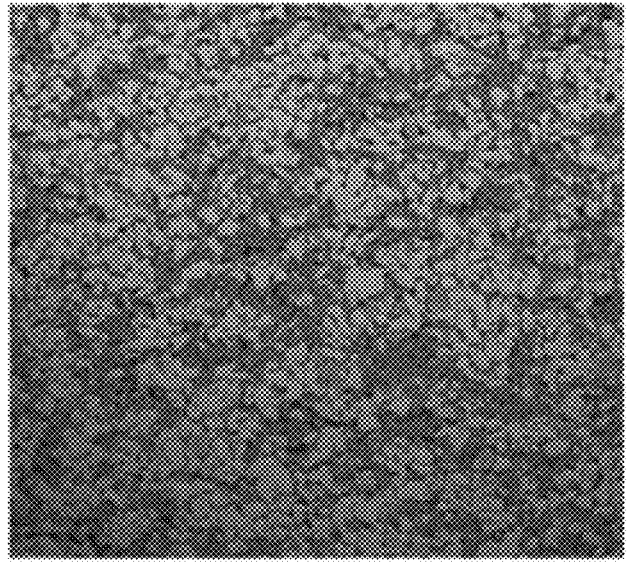

FIGS. 6A and 6B show cross-sectional SEM images (backscattered electron images) of Sample A and Sample B obtained in the above manner. FIG. 6A shows the SEM image of Sample A and FIG. 6B shows the SEM image of Sample B. In either image, low contrast portions (white portions) are active material particles. As is clear from the comparison between FIGS. 6A and 6B, active material particles occupy a large area in Sample A whereas they occupy a small area in Sample B. That is, the density of the active material in Sample A is higher than in Sample B.

Figure 7A:
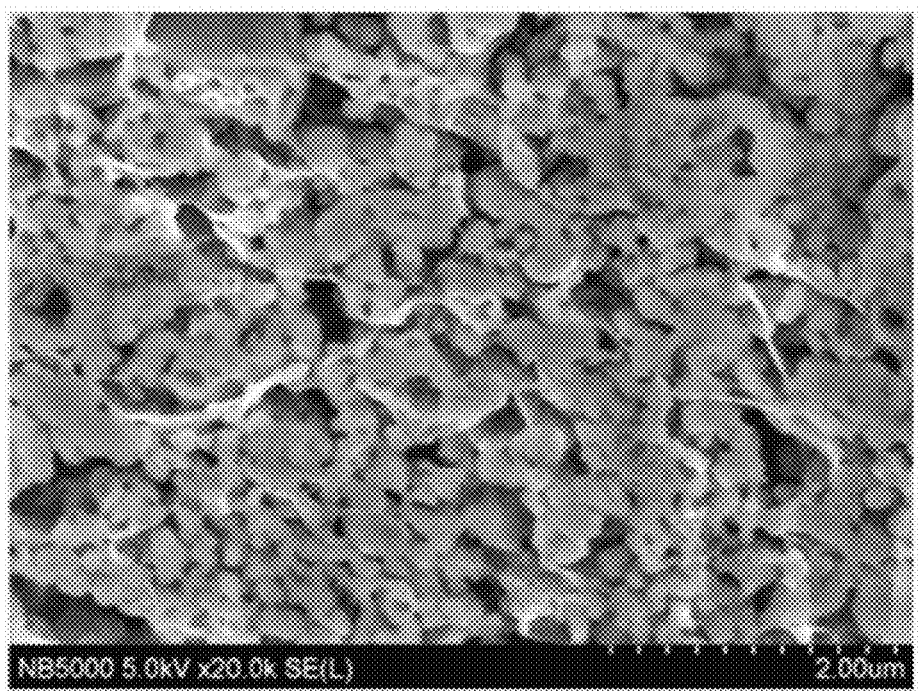
FIG. 7A is a cross-sectional SEM image of electrode fabricated in Example.
Figure 7B:
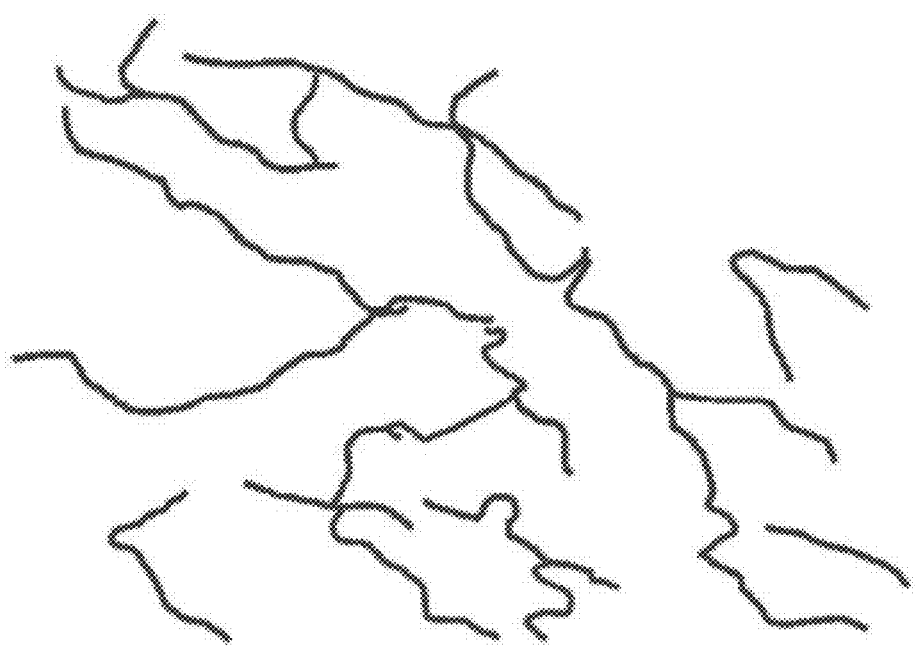
FIG. 7B is a view illustrating graphene.

FIG. 7A shows another cross-sectional SEM secondary electron image of Sample A. That cross section shows the state of the graphene net specifically, graphene nets were formed so as to include the active material particles. FIG. 7B shows only graphene net portions extracted from FIG. 7A.

Circular Sample A and Sample B were stamped out together with the current collectors. Batteries were fabricated by using the following: these, circular Sample A and Sample B together with the current collectors as the respective positive electrodes, metallic lithium for negative electrodes, a mixed solution of ethylene carbonate (EC) and diethyl carbonate (DEC) (with a volume ratio of 1:1) in which lithium hexafluorophosphate ($LiPF_6$) (concentration: 1 mol/L) was dissolved as electrolytes, and polypropylene separators as separators.

Discharging characteristics of these batteries were measured and then charging characteristics thereof were measured. Note that the discharging rate was 0.2 C and the charging rate was 1 C. The charging was stopped when the constant voltage becomes 4.3 V and then the current dropped to 0.016 C.

Figure 8:
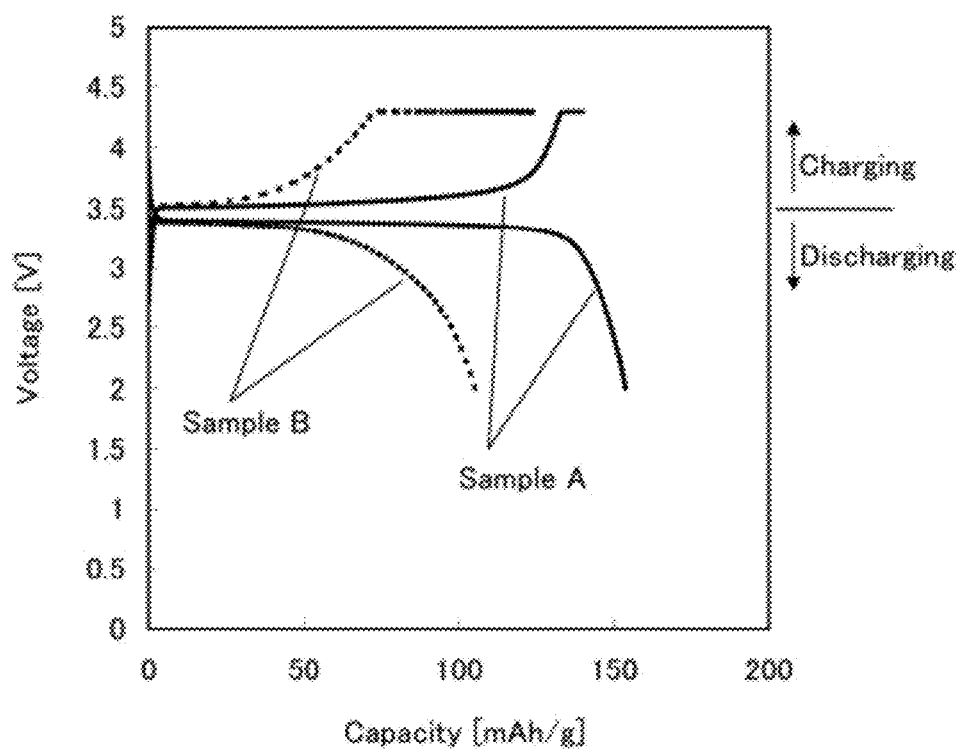
FIG. 8 shows characteristics of lithium secondary batteries fabricated in Example.

FIG. 8 shows discharging and charging characteristics of the batteries including Sample A and Sample B. It turns out that Sample A is excellent in both discharging and charging compared to Sample B. Note that the capacity is a capacity value per weight of active material. As described above, although the two electrodes had the same weight. Sample A contains a larger amount, of the active material than Sample B. Therefore, Sample A has larger capacity per weight of electrode than Sample B.

Example 2

To investigate the effect of a graphene obtained by reducing graphene oxide, the following two samples were fabricated and their characteristics were compared. In a manner similar to that in Example 1, Sample C was fabricated by applying a mixture of only active material (lithium iron phosphate) particles (which are not carbon coated) and graphene oxide onto a current collector (aluminum) and heating the mixture in a vacuum at 300° C. for 10 hours. The ratio of the graphene oxide to the lithium iron phosphate was 5:95. Note that the graphene oxide was reduced by heating treatment, so that the weight is assumed to be reduced by half.

Sample D was fabricated by applying a mixture of active material (lithium iron phosphate) particles whose surfaces are carbon coated, a binder (polyvinylidene fluoride (PVDF) produced by KUREHA CORPORATION), and a conduction auxiliary agent (acetylene black produced by DENKI KAGAKU KOGYO KABUSHIKI KAISHA) onto a current collector (aluminum) and drying the mixture. The current collector was the same as that of Sample C. In general, by carbon coating lithium iron phosphate particles, electricity that substantially corresponds to theoretical capacity can be stored.

The lithium iron phosphate particles of Sample C were the same as those in Example 1. Further, the graphene oxide was the same as that in Example 1. Sample C was fabricated in a manner similar to that for Sample A.

The lithium iron phosphate particles of Sample D were prepared as follows. First, lithium carbonate ($Li_2CO_3$), iron oxalate ($Fe(C_2O_4).2H_2O$), and ammonium dihydrogen phosphate ($NH_4H_2PO_4$) were weighed out such that the molar ratio therebetween was 1:2:2, and were ground and mixed with a wet ball mill (the ball diameter was 3 mm and acetone was used as a solvent) at 400 rpm for 2 hours.

After the drying, pre-baking was performed at 350° C. for 10 hours in a nitrogen atmosphere, and the grinding and mixing were performed again with the wet ball mill (the ball diameter was 3 mm) at 400 rpm for 2 hours. Then, 10 wt % glucose was added, and baking was performed at 600° C. for 10 hours in a nitrogen atmosphere.

Sample D was obtained by mixing 80 wt % active material particle (including the weight of the carbon coating), a 5 wt % binder, and a 15 wt % conduction auxiliary agent with NMP having a weight twice as large as the total weight of the active material particles, the binder, and the conduction auxiliary agent, applying the mixture onto a current collector of aluminum (with a thickness of 20 μm), force-air drying the mixture at 120° C. for 15 minutes, and heating the mixture at 180° C. for 10 hours in a vacuum.

Circular Sample C and Sample D were stamped out together with the current collectors. Batteries were fabricated by using the following: these circular Sample C and Sample D together with the current collectors as the respective positive electrodes, metallic lithium for negative electrodes, a mixed solution of ethylene carbonate (EC) and diethyl carbonate (DEC) (with a volume ratio of 1:1) in which lithium hexafluorophosphate ($LiPF_6$) (concentration: 1 mol/L) was dissolved as electrolytes, and polypropylene separators as separators.

Discharging characteristics of these batteries were measured and then charging characteristics thereof were measured. Note that the discharging rate was 0.2 C and the charging rate was 0.2 C.

In Example 2, charging capacity and discharging capacity per weight of active material layer which is to be actually used are compared. As described above, the active material layer formed over the current collector includes, in addition to the active material (or the active material particles), the binder, the conduction auxiliary agent, the graphene nets, and the like, which are necessary for charging and discharging. Therefore, to compare performance of batteries properly, capacities per weight of active material layer need to be compared.

Figure 9:
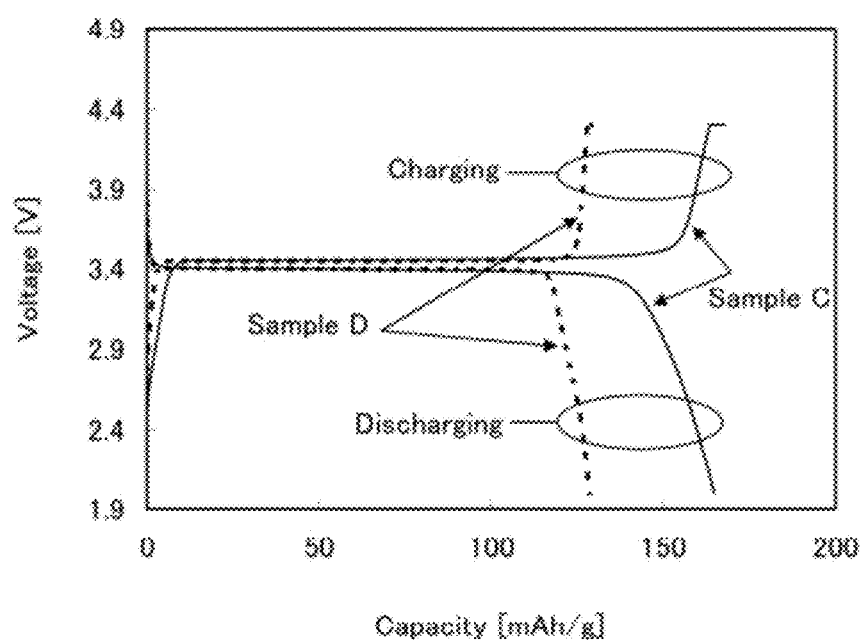
FIG. 9 shows characteristics of lithium secondary batteries fabricated in Example.

FIG. 9 shows discharging and charging characteristics of the batteries including Sample C and Sample D. Sample D contains the 20 wt % binder and conduction auxiliary agent, whereas Sample C contains only about 2.5 wt % graphene net besides the active material. Therefore, by comparison between positive electrode active material layers having the same weight, Sample C can store a larger amount of electricity.

EXPLANATION OF REFERENCE

100: negative electrode current collector, 102: negative electrode active material layer, 104: negative electrode, 106: housing, 110: separator, 120: ring-shaped insulator, 128: positive electrode current collector, 130: positive electrode active material layer, 132: positive electrode, 140: spacer, 142: washer, 144: housing, 201: display device, 202: housing, 203: display portion, 204: speaker portions, 205: power storage device, 211: lighting device, 212: housing, 213: light source, 214: power storage device, 215: ceiling, 216: wall, 217: floor, 218: window, 221: indoor unit; 222: housing, 223: ventilation duct, 2241 power storage device, 225: outdoor unit, 231: electric refrigerator-freezer, 232: housing, 233: door for refrigerator, 234: door for freezer, 235: power storage device.

This application is based on Japanese Patent Application serial no. 2011-124861 filed, with Japan Patent Office on Jun. 3, 2011, Japanese Patent Application serial no. 2011-140521 filed with Japan Patent Office on Jun. 24, 2011, and Japanese Patent Application serial no. 2011-141018 filed with Japan Patent Office on Jun. 24, 2011, the entire contents of which are hereby incorporated by reference.

The invention claimed is:

1. A method of manufacturing an electrode comprising a graphene net, comprising steps of:
  making a mixture of graphene oxide and a plurality of active material particles;
  applying the mixture onto a current collector after making the mixture; and
  heating the mixture at 200° C. or higher after applying the mixture, wherein the graphene oxide is reduced by heating the mixture,
  wherein the plurality of active material particles comprises lithium-containing composite oxide.

2. The method of manufacturing the electrode according to claim 1,
  further comprising a step of adding a conduction auxiliary agent comprising acetylene black, graphite particles, or carbon fibers to the mixture.

3. The method of manufacturing the electrode according to claim 1,
  further comprising a step of adding a binder comprising a polymer organic compound to the mixture.

4. The method of manufacturing the electrode according to claim 1,
  wherein surfaces of the plurality of active material particles are coated with a conductive film comprising carbon.

5. The method of manufacturing the electrode according to claim 1,
  wherein a proportion of elements other than carbon and hydrogen in the graphene net is lower than or equal to 15 atomic %.

6. The method of manufacturing the electrode according to claim 1,
  wherein an average particle size of the plurality of active material particles is smaller than or equal to 150 nm.

7. The method of manufacturing the electrode according to claim 1,
  wherein an average particle size of the plurality of active material particles is greater than or equal to 20 nm and smaller than or equal to 100 nm.

8. The method of manufacturing the electrode according to claim 1,
  wherein the plurality of active material particles are particles of lithium cobaltate, lithium iron phosphate, or lithium manganese phosphate.

9. The method of manufacturing the electrode according to claim 1,
  wherein the heating step is performed under a vacuum or a reducing atmosphere.

10. The method of manufacturing the electrode according to claim 1,
  wherein the graphene net has a portion partially wrapped around the active material particles, and
  wherein the graphene net includes an open portion exposing the active material particles.

11. A method of manufacturing an electrode, comprising steps of:
  making a mixture of graphene oxide and a plurality of active material particles;
  applying the mixture onto a current collector after making the mixture; and
  reducing the mixture on the current collector so as to form a graphene net after applying the mixture,
  wherein the current collector comprises aluminum, and
  wherein the plurality of active material particles comprises lithium-containing composite oxide.

12. The method of manufacturing the electrode according to claim 11,
  further comprising a step of adding a conduction auxiliary agent comprising acetylene black, graphite particles, or carbon fibers to the mixture.

13. The method of manufacturing the electrode according to claim 11,
  further comprising a step of adding a binder comprising a polymer organic compound to the mixture.

14. The method of manufacturing the electrode according to claim 11,
  wherein surfaces of the plurality of active material particles are coated with a conductive film comprising carbon.

15. The method of manufacturing the electrode according to claim 11,
  wherein a proportion of elements other than carbon and hydrogen in the graphene net is lower than or equal to 15 atomic %.

16. The method of manufacturing the electrode according to claim 11,
  wherein an average particle size of the plurality of active material particles is smaller than or equal to 150 nm.

17. The method of manufacturing the electrode according to claim 11,
  wherein an average particle size of the plurality of active material particles is greater than or equal to 20 nm and smaller than or equal to 100 nm.

18. The method of manufacturing the electrode according to claim 11,
  wherein the plurality of active material particles are particles of lithium cobaltate, lithium iron phosphate, or lithium manganese phosphate.

19. The method of manufacturing the electrode according to claim 11, wherein the reducing step is performed under a vacuum or a reducing atmosphere.

20. The method of manufacturing the electrode according to claim 11,
wherein the graphene net has a portion partially wrapped around the active material particles, and
wherein the graphene net includes an open portion exposing the active material particles.

21. A method of manufacturing an electrode, comprising steps of:
making a slurry comprising a piece of graphene oxide and a particle of an active material;
applying the slurry onto a current collector to form an active material layer comprising the piece of graphene oxide and the particle of the active material after making the slurry; and
reducing the graphene oxide in the active material layer.

22. The method of manufacturing an electrode according to claim 21,
wherein the slurry consists of the piece of graphene oxide, the particle of the active material, and a solvent by making the slurry.

23. The method of manufacturing an electrode according to claim 21,
wherein the active material is a positive electrode material, and
wherein an average particle size of the particle of the active material is smaller than or equal to 150 nm.

24. A method of manufacturing a power storage device, comprising steps of:
manufacturing an electrode according to claim 21; and
providing a negative electrode through a separator interposed therebetween.

* * * * *